United States Patent
Cordeiro

(10) Patent No.: US 8,428,518 B2
(45) Date of Patent: Apr. 23, 2013

(54) TRAFFIC CONSTRAINTS IN A MMWAVE WIRELESS NETWORK

(75) Inventor: Carlos Cordeiro, Portland, OR (US)

(73) Assignee: Intel Corporation, Santa Clara, CA (US)

(*) Notice: Subject to any disclaimer, the term of this patent is extended or adjusted under 35 U.S.C. 154(b) by 751 days.

(21) Appl. No.: 12/584,783

(22) Filed: Sep. 11, 2009

(65) Prior Publication Data

US 2011/0065394 A1    Mar. 17, 2011

(51) Int. Cl.
 *H04B 1/00*     (2006.01)
 *H04B 15/00*    (2006.01)

(52) U.S. Cl.
 USPC ... 455/63.1; 455/67.13; 455/41.2; 455/114.2; 455/278.1; 455/296; 370/338; 370/342; 370/350; 370/328; 342/357.31; 342/145

(58) Field of Classification Search ........... 455/63.1, 455/67.13, 41.2, 114.2, 278.1, 296; 370/338, 370/339, 445, 334, 342, 350, 311, 328; 342/357.31, 342/36, 145
 See application file for complete search history.

(56) References Cited

U.S. PATENT DOCUMENTS

| | | | |
|---|---|---|---|
| 6,891,857 B1 * | 5/2005 | Nevo et al. | 370/480 |
| 7,215,659 B1 * | 5/2007 | Chen et al. | 370/338 |
| 7,280,801 B2 * | 10/2007 | Dahl | 455/41.2 |
| 7,440,484 B2 * | 10/2008 | Schmidl et al. | 375/135 |
| 7,460,503 B2 * | 12/2008 | Young | 370/331 |
| 7,486,932 B2 * | 2/2009 | Palin et al. | 455/41.2 |
| 7,738,895 B2 * | 6/2010 | Terry | 455/518 |
| 7,801,099 B2 * | 9/2010 | Desai | 370/338 |
| 7,809,012 B2 * | 10/2010 | Ruuska et al. | 370/449 |
| 7,899,396 B2 * | 3/2011 | Meylan et al. | 455/41.2 |
| 7,907,562 B2 * | 3/2011 | Murty et al. | 370/328 |
| 7,920,883 B2 * | 4/2011 | Tu | 455/512 |
| 7,941,149 B2 * | 5/2011 | Wang et al. | 455/445 |
| 8,009,603 B2 * | 8/2011 | Lu et al. | 370/312 |
| 8,081,592 B2 * | 12/2011 | Sampath et al. | 370/312 |
| 8,089,982 B1 * | 1/2012 | Vleugels et al. | 370/447 |
| 8,169,940 B2 * | 5/2012 | Park et al. | 370/311 |

(Continued)

FOREIGN PATENT DOCUMENTS

| | | |
|---|---|---|
| KR | 10-0740170 B1 | 7/2007 |
| KR | 10-0754224 B1 | 9/2007 |

(Continued)

OTHER PUBLICATIONS

International Preliminary Report on Patentability and Written Opinion received for PCT Patent Application No. PCT/US2010/047516, mailed on Mar. 22, 2012, 6 pages.

(Continued)

*Primary Examiner* — Marceau Milord
(74) *Attorney, Agent, or Firm* — Sutherland Asbill & Brennan LLP

(57) ABSTRACT

A network controller may schedule directional communications between two devices in its own network in such a way as to avoid potential interference from anticipated transmissions from another device. In some instances, the network controller may be one of the two devices using the directional communications. The timing of the anticipated transmissions may be determined by the network controller based on its own observations, or it may be informed of that timing in a transmission from a device in its own network. A possible format is given for transmitting that information to the network controller.

22 Claims, 5 Drawing Sheets

U.S. PATENT DOCUMENTS

| | | | |
|---|---|---|---|
| 8,170,488 B2 * | 5/2012 | Cordeiro et al. | 455/63.1 |
| 8,184,582 B2 * | 5/2012 | Banerjee et al. | 370/329 |
| 2006/0194538 A1 * | 8/2006 | Palin et al. | 455/41.2 |
| 2006/0268908 A1 * | 11/2006 | Wang et al. | 370/401 |
| 2010/0054213 A1 | 3/2010 | Trainin | |
| 2010/0074190 A1 * | 3/2010 | Cordeiro et al. | 370/329 |
| 2010/0329178 A1 | 12/2010 | Cordeiro | |

FOREIGN PATENT DOCUMENTS

| | | |
|---|---|---|
| KR | 10-2007-0106351 A | 11/2007 |
| WO | 2011/031608 A2 | 3/2011 |
| WO | 2011/031608 A3 | 6/2011 |

OTHER PUBLICATIONS

International search report and written opinion received for PCT Patent Application No. PCT/US2010/047516, mailed on May 2, 2010, 9 pages.

Trainin, S., U.S. Appl. No. 12/544,917, filed Aug. 20, 2009 entitled Method and Apparatus for Direct Reliable Link Access.

Cordeiro, C., U.S. Appl. No. 12/459,151, filed Jun. 26, 2009 entitled Use of Delayed Clear-To-Send and Denial-To-Send in Directional Wireless Networks.

* cited by examiner

TRAFFIC CONSTRAINTS IN A MMWAVE WIRELESS NETWORK

BACKGROUND

Wireless communications networks that operate with frequencies at or above a few tens of gigahertz (with corresponding wavelengths of a few millimeters or less) typically have a very short signal range and are therefore used primarily for personal area networks (PANs). When many PANs are located close together, such as in an office environment, interference between adjacent PANs can be a significant problem. Directional communications are frequently used to alleviate this problem, but typical methods of scheduling non-interfering wireless communications (such as the RTS/CTS technique) are not well suited for networks using directional communications. In particular, when a STA requests some channel time with its NC, the NC may not be aware of a repeating interfering signal coming from an adjacent PAN, and may schedule time for the STA that overlaps with that interfering signal. During the period of overlap, it is likely that communications in one PAN will interfere with communications in the other PAN, and possible that both PANs will interfere with each other.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
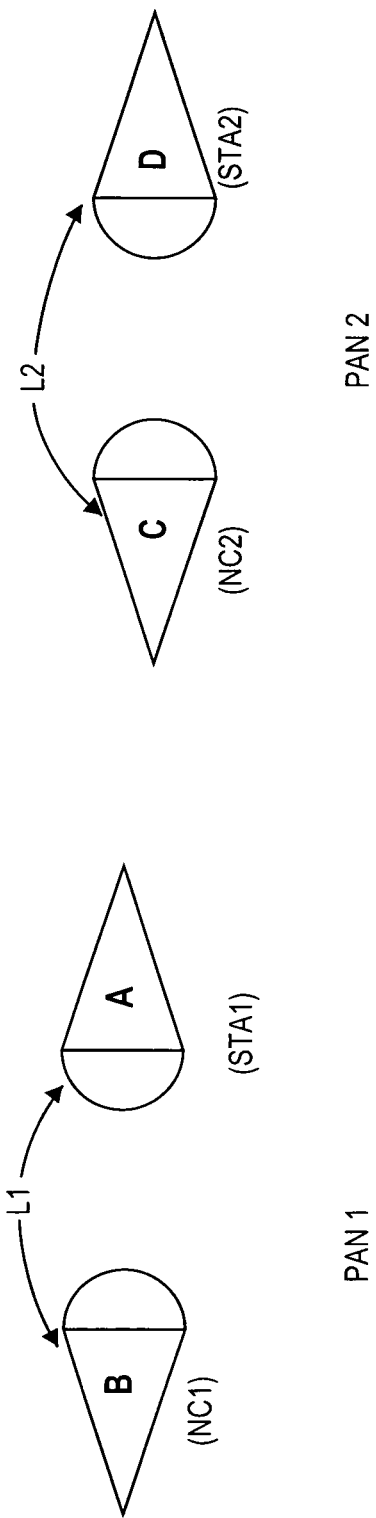
FIG. 1 shows two overlapping and potentially interfering wireless networks, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. A wireless device may comprise at least one antenna, at least one radio, and at least one processor, where the radio transmits signals through the antenna that represent data and receives signals through the antenna that represent data, while the processor may process the data to be transmitted and the data that has been received. The processor may also process other data, which is neither transmitted nor received.

The term "network controller", or "NC", is used herein to describe a wireless communications device that schedules wireless communications with other devices associated with it in the network. The term "STA" is used herein to describe a wireless communications device that is associated with the NC, and whose communications with the NC or with other STAs in the network are largely scheduled by the NC. The term "associated" indicates that the STA has provided sufficient information about itself that the NC is aware of the existence of the STA, and the NC and STA have agreed on enough protocols that the NC permits the STA to operate in that network. For simplicity of description, the terms network controller and STA may be used frequently in this document, but other terms may be used elsewhere to describe devices having the same functionality. For example, devices labeled base station (BS), access point (AP), control point (CP), PCP, PCP/AP, etc., may be used in place of NC, and devices labeled mobile station (MS), subscriber station (SS), DEV, etc. may be used in place of STA. The various embodiments of the invention are intended to be broad enough to include all such devices with equivalent functionality, regardless of the labels used to describe them.

It may be assumed that at least some of the devices in a network have the ability to establish both directional transmissions and directional receptions. A directional transmission means the transmission is relatively strong in one direction and relatively weak in the other directions, within the intended frequency band. A directional reception means the receiving device can receive signals from one direction more easily than it can receive equivalent strength signals from other directions, within the intended frequency band. Directional transmissions and receptions may be implemented by having multiple antennas on the same device, and processing the signals for each antenna differently, but other techniques may be used instead.

FIG. 1 shows two overlapping and potentially interfering wireless networks, according to an embodiment of the invention. Each network is labeled as a personal area network (PAN), as that is the size of network that is seen as most likely to benefit from the techniques described here, but other sizes of networks (such as but not limited to a short-range local area network) may also be included in various embodiments of the invention. Each device in the networks may have a processor, a memory, a radio, and multiple antennas, and be capable of directional transmission and directional reception. These components, when properly configured with other components and/or software, may enable these devices to perform the operations described herein.

The first network is labeled PAN 1, and includes a network controller NC1 (device B) and another wireless communications device STA1 (device A). NC1 and STA1 have established a directional communication link L1 with each other. Similarly, the second network is labeled PAN 2, and includes a network controller NC2 (device C) and another wireless communications device STA2 (device D). NC2 and STA2 have established a directional communication link L2 with each other. All four devices are shown to be physically located in a relatively straight line. Because of this physical positioning, a transmission from device B to device A may inadvertently be overheard by device D, even though device D is in a different network than device B and the two devices are not trying to communicate with each other. (Within the context of this document, the term 'overhear', or its derivatives, is used to describe receiving a transmission that is intended for another device in another network, and receiving it with sufficient signal strength to properly decode the contents and/or with sufficient signal strength that it represents a source of interference.) Similarly, a transmission from device D to device C may be overheard by device B. Without proper scheduling, a transmission from B might interfere with a transmission from C to D, or a transmission from D might interfere with a transmission from A to B.

Figure 2:
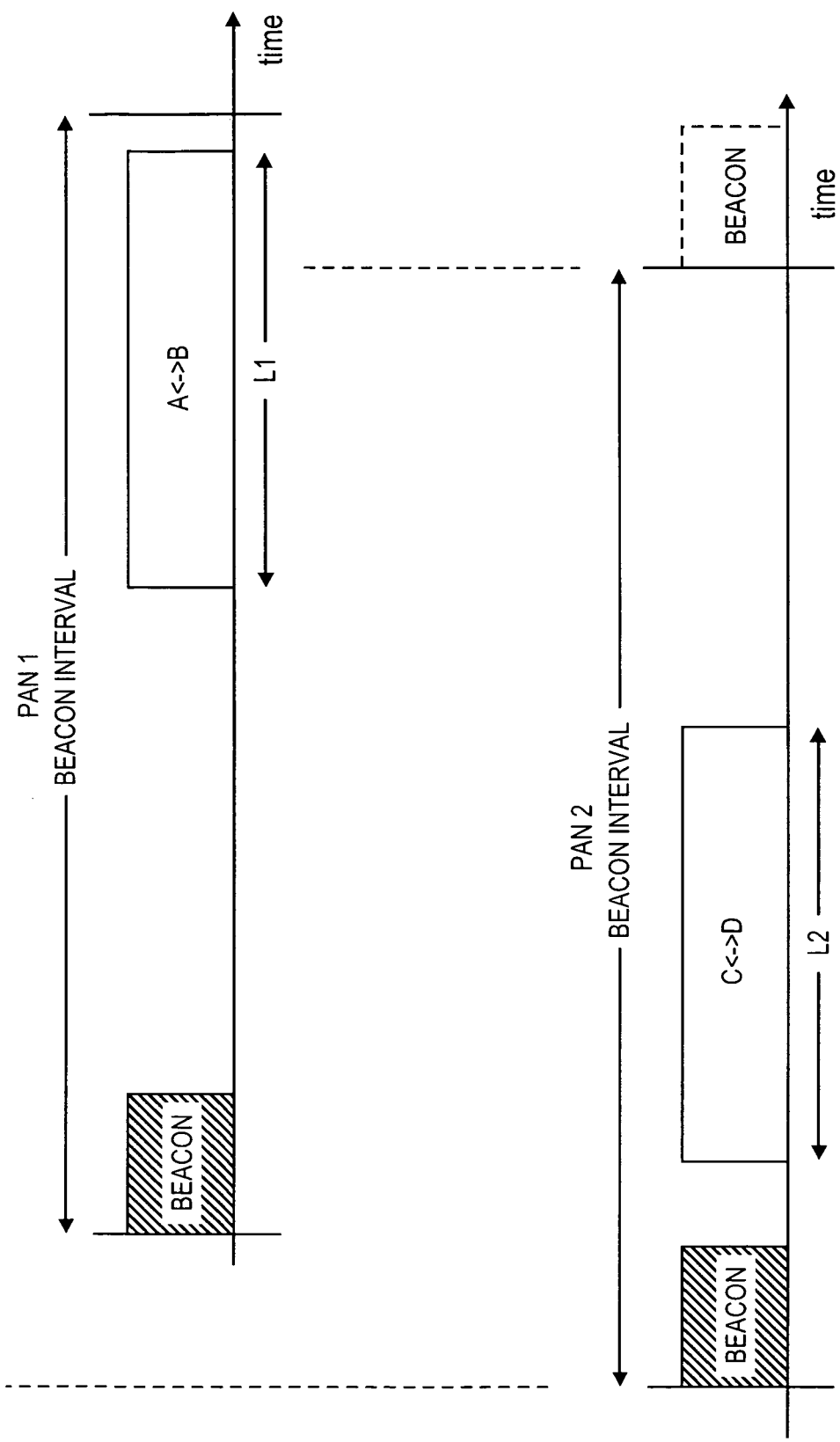
FIG. 2 shows a timing diagram of communication scheduling within two networks, according to an embodiment of the invention.

FIG. 2 shows a timing diagram of communication scheduling within two networks, according to an embodiment of the invention. The operations in FIG. 2 assume the devices and their positioning as shown in FIG. 1. Since PAN 1 and PAN 2 are two different networks, their beacon intervals may not be synchronized, i.e., the beacon and subsequent beacon interval for PAN 1 starts later than the beacon and subsequent beacon interval for PAN 2. The beacon interval for PAN 1 may overlap parts of two different beacon intervals for PAN 2, and vice-versa. Although not synchronized with each other, the beacon intervals for both networks are shown to be the same length, so that the relative timing between the beacons for the two networks may remain constant over many beacon intervals.

In the illustrated example, device A (STA1) has requested channel time from device B (NC1), and has been granted time period L1 for subsequent communications between devices A and B. In many instances, this time period that L1 occupies within the beacon interval will be repeated for multiple consecutive beacon intervals established by NC1. During L1, device A may transmit to device B and device B may transmit to device A with whatever schedule they determine to use, and this schedule may change with each successive beacon interval, even though the overall time period for L1 remains constant from one beacon interval to the next. However, it should be assumed that device B might transmit a signal that could be overheard by device D at any time during time period L1, during any beacon interval that includes the reserved time period L1.

Similarly, in the illustrated example, device D (STA2) has requested channel time from device C (NC2), and has been granted time period L2 for subsequent communications between devices C and D. During L2, device C may transmit to device D and device D may transmit to device C with whatever schedule they determine to use. Similar to before, it should be assumed that device D might transmit a signal that could be overheard by device B at any time during time period L2 during any beacon interval that includes L2. If device C is unaware of the L1 reservation in the other network, it might schedule L2 for a time that overlaps L1, thus setting up the potential for interference between the two networks at any time during which L1 and L2 overlap. But in the example shown, L2 has been scheduled in such a way that it does not overlap L1, thus avoiding that potential interference. To assure that L1 and L2 do not overlap, device C needs to know about the potentially interfering time period L1.

This knowledge may be gained in various ways, such as but not limited to:

1) device D may learn of L1 in advance by overhearing the scheduling information that was transmitted from device B to device A, and pass that information on to device C. However, that scheduling information would likely be relative to the beacon timing in PAN1, and may need to be converted to the beacon timing of PAN 2 before it will be useful to devices C and D. This conversion may be relatively simple if device D also receives the beacon from device B, and thus can adjust the received timing information by the amount of offset between the beacon in PAN 1 and the beacon in PAN 2.

2) device D may learn of L1 by overhearing transmissions from device B during that time period (especially if those transmissions occur repeatedly in multiple beacon intervals), and pass that information on device C. Device D would already know the timing of that interference with respect to the beacon timing of PAN 2, and so no conversion should be necessary.

3) device C may note that communications with device D frequently fail during the time period corresponding to L1, and deduce that this is due to interference from a neighboring device.

Figure 3:
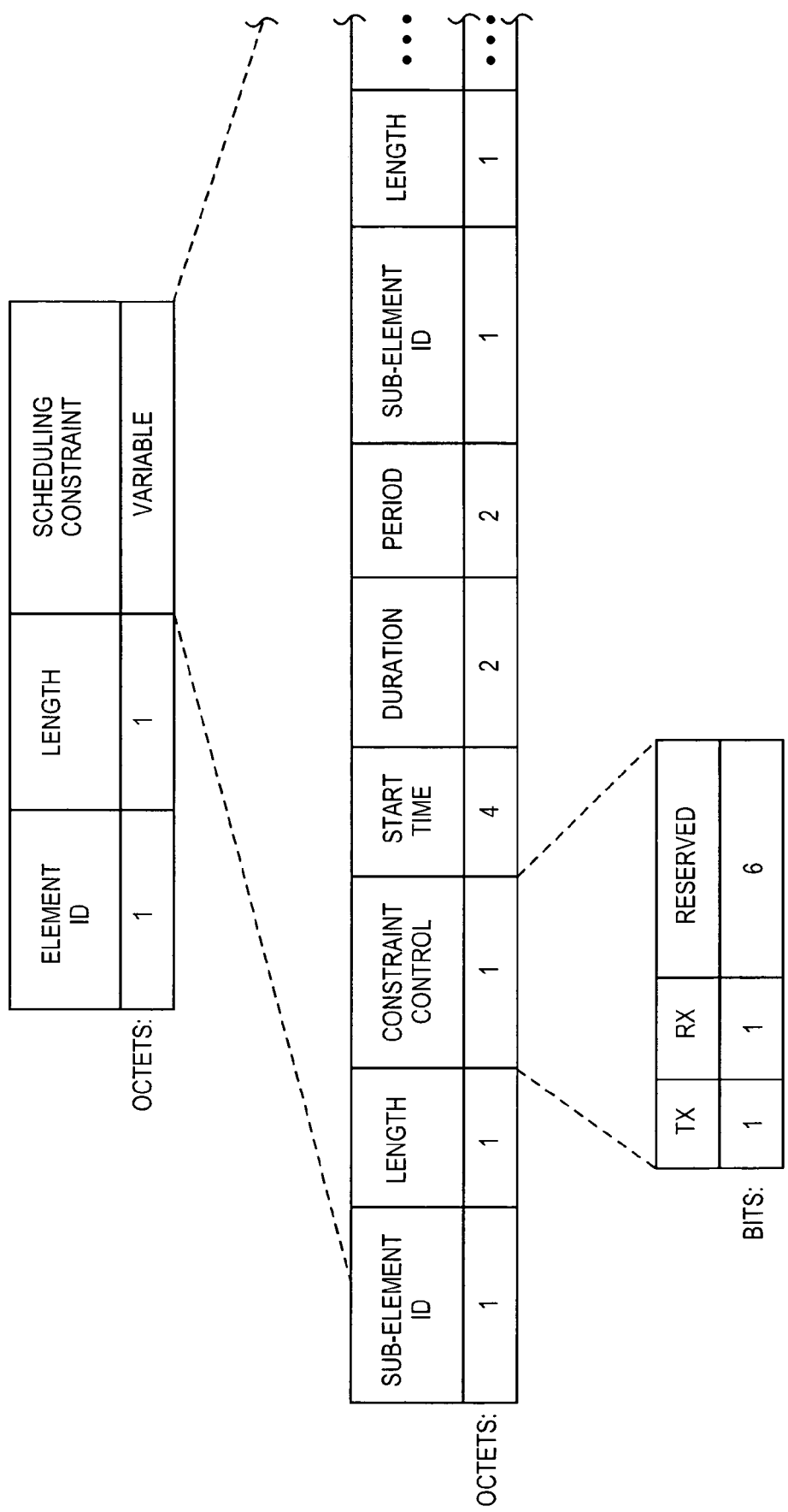
FIG. 3 shows a format for an information element to convey scheduling constraint information, according to an embodiment of the invention.

FIG. 3 shows a format for an information element to convey scheduling constraint information, according to an embodiment of the invention. This format may be used, for example, to convey the timing of L1 from device C to device D, so that device D will be constrained from scheduling (will avoid scheduling) communications with device C during the indicated time period. Although a specific format is shown, this is for illustrative purposes and other formats may be used. In this example, it is assumed that the indicated constraints only apply to communications between the two devices exchanging the following information. Other STAs may transmit their own constraint information to the NC to constrain their own communications with it.

An information element (IE) is a format that is sometimes used to convey various types of information within a larger format in a wireless transmission. The IE shown in the top row of FIG. 3 has the standard beginning, with an Element ID field to indicate what type of information it carries, and a length field to indicate the length of the IE so that the IE can be distinguished from other information that follows the IE in the transmission. In this example, each of the Element ID and Length fields are one octet (8 bits) in length, while the Scheduling Constraint field may have a variable length so that, if desired, multiple time periods may be indicated by repeating the fields that describe those time periods. The end of this variable field may be indicated by the value in the Length field.

A possible format for the contents of the Scheduling Constraint field are indicated in the second row of FIG. 3. This field begins with a Sub-Element ID field of one octet to indicate what type of information the Scheduling Constraint field carries, and a Length field to indicate the end of the fields describing this particular constraint (i.e., the first five fields in this example).

Following the Length field, this format shows a Constraint Control field, to indicate how to apply the constraints. The Constraint Control field is followed by a Start Time field, a Duration field, and a Period field. The value in the Start Time field indicates when the constrained time period begins (e.g., when the beginning of L1 occurs in the above example). The value of Start Time may be indicated in any feasible units of time (e.g., micro-seconds), and may be referenced to any feasible point in time (e.g., from the beginning of the beacon interval). In a similar manner, the Duration field may be expressed in any feasible units of time (i.e., microseconds). The Period field may be used to define how long the constraint is to be applied, such as across multiple beacon fields. The Period field may be expressed in any feasible units, such microseconds or number of beacon intervals. In other embodiments, other units of time and other reference points may be used for any of these fields.

Note that this particular format may be used to indicate more than one constrained time period, by repeating the first five fields of the Scheduling Constraint field for each such time period (the example shows the first part of a second set of five fields to indicate a second time period). The Sub-Element ID value may be the same for each set, but the values of Length, Constraint Control, Start Time, Duration, and Period may be the same or different for each set. These fields may be repeated multiple times to indicate multiple constrained time periods, providing the result doesn't exceed any other length or time constraints (such as the maximum allowed length in the Length field of the IE in the first row of FIG. 3). In some cases, the time periods defined by different sets may overlap.

A possible format for the contents of the Constraint Control field is indicated in the third row of FIG. 3. For example, the TX field may be used to indicate that transmissions from the device receiving the IE to the device transmitting the IE, should not take place during the indicated time period. (A '1' may indicate don't transmit, a '0' may indicate OK to transmit, or vice-versa.) Similarly, the RX field may be used to indicate that the device transmitting this IE should not be scheduled to transmit to the device receiving this IE, during the indicated time period. These conventions assume that TX and RX are from the point of view of the device receiving the IE (presumably the NC), but the opposite convention might alternately be used without departing from the inventive concepts described herein. The next 6 bits may be reserved for future uses that are presently undefined.

By having separate fields for transmission and reception, this format is flexible enough to constrain transmissions, receptions, both, or neither. For example, one set of constraints may be applied to transmissions, and another set of constraints applied to receptions.

The indicated constraints may come to an end in various ways. In one embodiment, the constraints only apply to a single beacon interval and must be renewed for each new beacon interval. In another embodiment, the constraints may continue indefinitely until changed. In another embodiment, the constraints may be applied for a pre-defined number of beacon intervals. In still another embodiment, the constraints may be applied for a defined time period or number of beacon intervals, as described in FIG. 3. In some embodiments, the constraints may end when an IE specifies they no longer apply (e.g., by setting a '0' in the TX and/or RX bits of the Constraint Control field). In some embodiments, the constraints may end after a default number of beacon intervals has passed without being ended through some other means. Of course, the current constraints may be renewed or changed at any time by transmitting a new IE indicating the new values.

Figure 4:
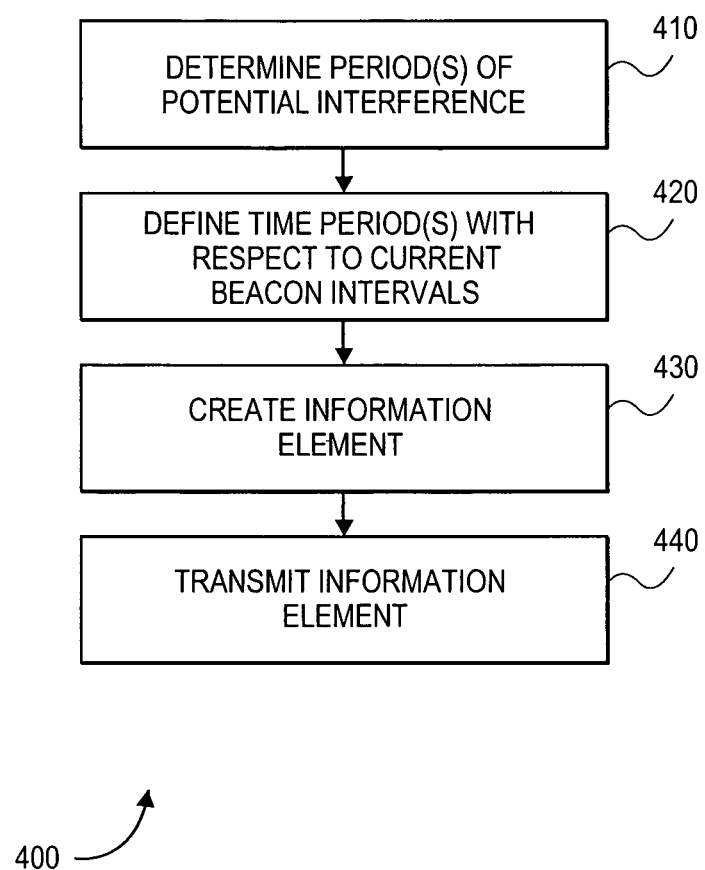
FIG. 4 shows a flow diagram of a method performed by a STA, according to an embodiment of the invention.

FIG. 4 shows a flow diagram of a method performed by a STA, according to an embodiment of the invention. In the illustrated flow diagram 400, at 410 the STA may determine a period of potential interference that is expected to occur in at least one subsequent frame in its communications with its NC. This determination may be made in various ways, such as but not limited to: 1) the STA may overhear a schedule being transmitted by another NC for communications in another network, 2) the STA may overhear transmissions from another device that occur repeatedly during a particular time period within the STA's own beacon interval (i.e., the beacon interval set by the STA's own NC), 3) the STA may overhear a request from another STA to be granted a particular time period for subsequent communication in another network, 4) etc.

When receiving information about a scheduled or potentially scheduled time period in another network, such as choices 1) or 3) in the previous paragraph, the time period may have been expressed with reference to the other network's beacon intervals. To be useful in this network, that time period may need to be expressed with reference to this network's beacon interval, and that conversion may be accomplished at 420 of FIG. 4.

Once the STA has determined the one or more time periods that may represent potential periods of interference in its communications with its NC, at 430 that information may be placed into a form suitable for transmitting the information to the NC, such as in an IE. The information, whether in the form of an IE or some other form, may then be transmitted to the NC at 440. In some instances, the IE may be contained in the same transmission in which the STA requests channel time for subsequent communications. In some instances, the IE may be transmitted separately from the request for channel time.

Figure 5:
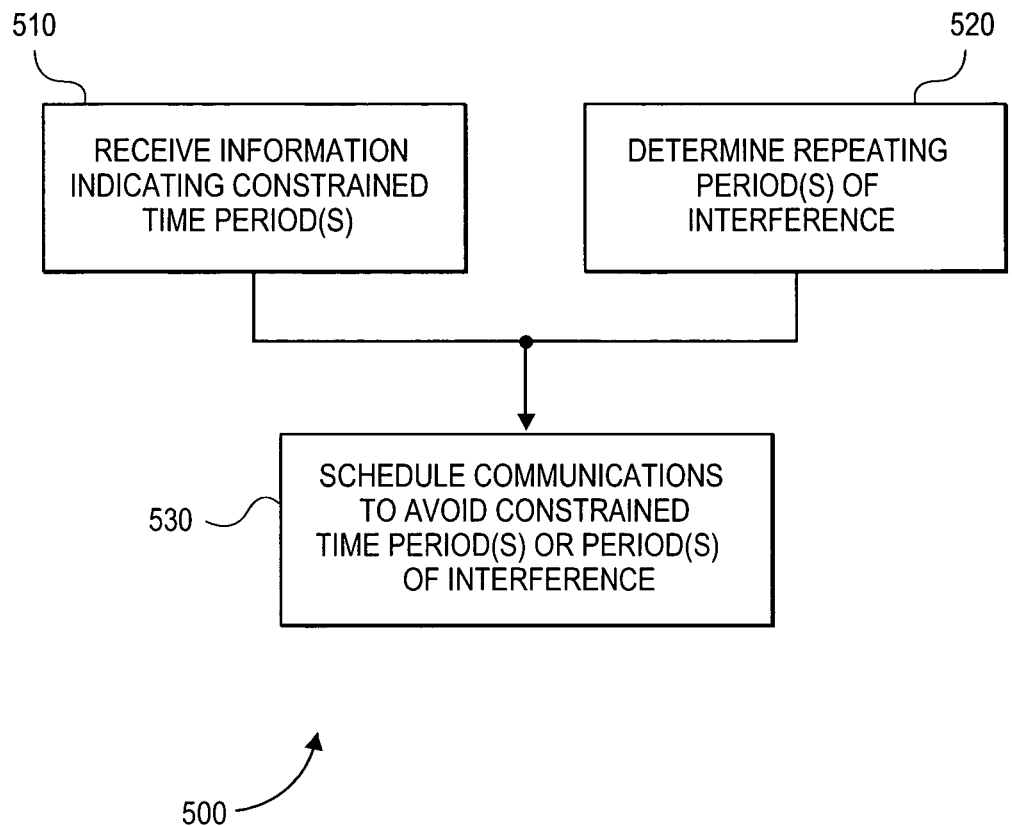
FIG. 5 shows a flow diagram of a method performed by a NC, according to an embodiment of the invention.

FIG. 5 shows a flow diagram of a method performed by a NC, according to an embodiment of the invention. In this method, the NC may get information about one or more periods of interference that may occur in its communications with a particular STA, and schedule those communications accordingly. The illustrated flow diagram 500 shows two ways the NC may get that information. At 510, the NC may receive information defining this time period from another device. For example, the NC may receive the information in an IE transmitted by a STA in its own network, such as the STA described in FIG. 4. Or the NC may overhear a transmission from another NC in another network, specifying a scheduled period of communications in that other network. If the NC can overhear that transmitted schedule when the NC's receiver is directed towards its own STA, it may assume it can also overhear potentially interfering transmissions made during the scheduled period.

In the second approach, at 520 the NC may determine the period of potential interference through its own observations. The NC may observe that its communications with a particular STA frequently fail during a particular time period within its own beacon intervals. Or it may detect transmissions from outside its own network that repeatedly occur during a particular time period when its receiver is directed towards its own STA, even though the NC isn't trying to receive from the STA at that time. In either case, once the NC determines which time period(s) may be subject to interference, at 530 it may schedule subsequent communications with the STA so that those communications do not occur during the period of potential interference.

The embodiments described so far have assumed that the communications that will be scheduled to avoid interference are communications between the NC and a STA. However, in other embodiments the scheduled communications are between two STAs, although the NC still schedules those communications. In such cases, information on which time periods to avoid may still be provided to the NC from a STA, along with information on which other STA will be involved in the scheduled communication. In that manner, the NC may schedule those STA-to-STA communications at a time that avoids the interfering transmissions from another network. The information as to which two STAs are involved may be included in the same transmission that contains the aforementioned IE, but externally to the IE.

The foregoing description is intended to be illustrative and not limiting. Variations will occur to those of skill in the art. Those variations are intended to be included in the various embodiments of the invention, which are limited only by the scope of the following claims.

What is claimed is:

1. An apparatus comprising a first wireless communications device having a processor, a memory, and a radio, the device configured to:
   determine a time period of potential interference in communications with a second wireless communications device, the interference to come from transmissions from a third wireless communications device, wherein the transmissions from the third wireless communications device is asynchronous with the second wireless communications device;
   derive information describing when the time period will occur with reference to a repeating beacon interval;
   create an information element containing values indicating a start time and a duration for the time period, the start time indicating a point of time within the beacon interval, wherein the information is contained in the information element; and
   transmit the information element to a network controller.

2. The apparatus of claim 1, wherein the information element further comprises one or more of the following:
   i. an indication of whether the potential interference occurs during a transmission by the first wireless communications device; or
   ii. an indication of whether the potential interference occurs during a reception by the first wireless communications device.

3. The apparatus of claim 1, further comprising a directional reception device; wherein the directional reception device is configured to receiving a transmission from the third wireless communications device during the time period.

4. A method, comprising
   performing operations in a first wireless communications device, the operations comprising:
   determining a first time period and a second time period of potential interference in a subsequent communication with a network controller, the interference to come from asynchronous transmissions from a second wireless communications device with reference to the first wireless communications device;
   deriving information defining the first and second time periods with respect to a beacon interval, the information defining the first and second time periods as one or more periods to avoid communications between the first wireless communications device and the network controller; and
   transmitting the information to the network controller.

5. The method of claim 4, further comprising:
   creating an information element containing indicators of a start time and a duration for the first time period, the start time indicating a point of time within the beacon interval, wherein said transmitting comprises transmitting the information element to the network controller.

6. The method of claim 5, wherein the information element includes a field indicating at least one of the following:
   i. an indication of whether the potential interference occurs during a transmission by the first wireless communications device; or
   ii. an indication of whether the potential interference occurs during a reception by the first wireless communications device.

7. The method of claim 4, further comprising creating an information element containing indicators of a start time and a duration for the second time period, the start time indicating a point of time within the beacon interval, wherein said transmitting comprises transmitting the information element to the network controller.

8. The method of claim 7, wherein the information element includes a field indicating one or more of the following:
   i) indicating whether the potential interference occurs during transmission by the first wireless communications devices; or
   ii) indicating whether the potential interference occurs during the reception by the first wireless communications device.

9. An article comprising
   a tangible computer-readable storage medium that contains instructions, which when executed by one or more processors result in performing operations comprising:
   determining, by a first wireless communications device, a time period of potential interference in subsequent communications involving a second wireless communications device, the interference to come from a third wireless communications device, wherein the transmissions from the third wireless communications device is asynchronous with the second wireless communications device;
   defining, by the first wireless communications device, the time period with respect to a beacon interval;
   creating, by the first wireless communications device, an information element containing values indicating a start time and a duration for the time period, the start time indicating a point of time within the beacon interval, wherein the information element is contained in the information; and
   transmitting, by the first wireless communications device, the information element to a network controller, the information element indicating the time period is a time period to avoid communications with the second wireless communications device.

10. The article of claim 9, wherein:
    the operation of determining comprises using directional reception to receive a transmission from the third device.

11. The article of claim 9, wherein the subsequent communications further comprises communications between the second wireless communications device and the network controller.

12. The article of claim 9, wherein the operation of transmitting further comprises directionally transmitting the information to the network controller.

13. An apparatus, comprising
a wireless network controller having a processor, a memory, and a radio, the controller configured to:
determine a first and second time period of potential interference in communications involving a first wireless communications device, the interference coming from an asynchronous transmission from a second wireless communications device with respect to the first wireless communications device;
define a communication period with respect to a beacon interval, wherein the communication period is not overlapping either the first or second time periods;
create a schedule identifying the defined communication period; and
transmit, to the first wireless communications device, the schedule.

14. The apparatus of claim 13, wherein the schedule further comprises an information element defining the communications period within the beacon interval.

15. A method, comprising
performing operations by a first wireless communications device, the operations comprising:
determining a first time period of potential interference in communications involving a second wireless communications device, the interference coming from a transmission from a third wireless communications device, wherein the transmissions from the third wireless communications device is asynchronous with the second wireless communications device;
creating an information element containing a schedule identifying a communications period for the first wireless communications device, the communications period being within a beacon interval and not overlapping the time period; and
transmitting, to the second wireless communications device, the information element.

16. The method of claim 15, wherein said determining comprises receiving a transmission from the second wireless communications device containing information describing timing of the first time period.

17. The method of claim 16, wherein the transmission from the second wireless communications device comprises an information element containing the information.

18. An article comprising:
a tangible computer-readable storage medium that contains instructions, which when executed by one or more processors result in performing operations comprising:
determining a first and second time periods of potential interference in communications involving a first wireless communications device, the interference coming from an asynchronous transmission from a second wireless communications device with respect to the first wireless communications device;
defining a communication period with respect to a beacon interval, the communication period not overlapping either the first time period or the second time period;
creating a schedule identifying the communication period; and
transmitting, to the first wireless communications device, the schedule.

19. The article of claim 18, wherein the operation of determining comprises receiving a transmission from the first wireless communications device containing information describing the first time period.

20. The article of claim 19, wherein the transmission from the first wireless communications device comprises an information element containing the information.

21. The article of claim 18, wherein the operation of determining comprises receiving a transmission from the first wireless communications device containing information describing the second time period.

22. The article of claim 21, wherein the transmission from the first wireless communications device comprises an information element containing the information.

* * * * *